L. C. BOWERS.

NOZZLE.

APPLICATION FILED APR. 27, 1911.

Reissued Feb. 6, 1912. 13,366.

Inventor

L. C. Bowers.

Witnesses

Ernest Becker

Henry T. Bright

By Reynolds & Chandler

Attorneys

COLUMBIA PLANOGRAPH CO., WASHINGTON, D. C.

UNITED STATES PATENT OFFICE.

LEWIS C. BOWERS, OF BOISE, IDAHO.

NOZZLE.

13,366. Specification of Reissued Letters Patent. Reissued Feb. 6, 1912.

Original No. 978,835, dated December 20, 1910, Serial No. 558,170. Application for reissue filed April 27, 1911. Serial No. 623,792.

*To all whom it may concern:*

Be it known that I, LEWIS C. BOWERS, a citizen of the United States, residing at Boise, in the county of Ada, State of Idaho, have invented certain new and useful Improvements in Nozzles; and I do hereby declare the following to be a full, clear, and exact description of the invention, such as will enable others skilled in the art to which it appertains to make and use the same.

This invention relates to nozzles.

The object of the invention resides in the construction of a nozzle in which the parts subjected to excessive wear may be easily and readily removed and replaced by corresponding new parts, thereby avoiding the nozzle being rendered useless as a whole when certain parts thereof are worn by usage.

A further object of the invention resides in constructing certain parts of the nozzle with a plurality of corresponding wearing surfaces so that said parts may be reversed and said surfaces successively presented for wear, thereby prolonging the life of the nozzle.

With the above and other objects in view the invention consists in the details of construction and in the combination and arrangement of parts as will be hereinafter more fully described and particularly pointed out in the appended claims.

Figure 1:
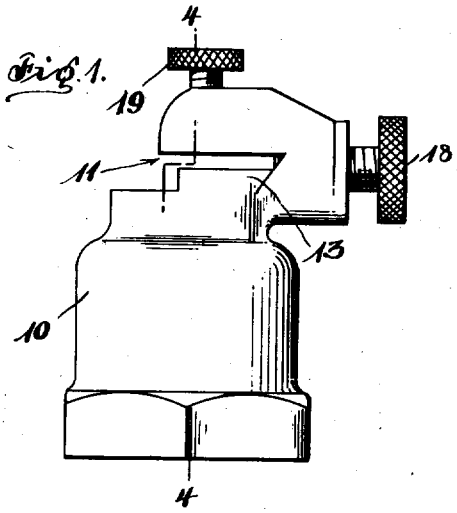
Figure 4:
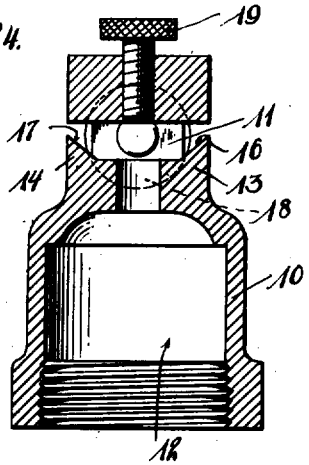
Figure 3:
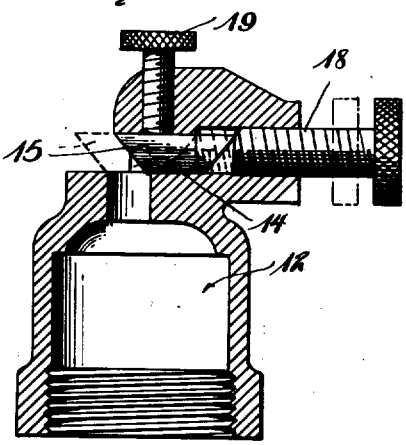
Figure 2:
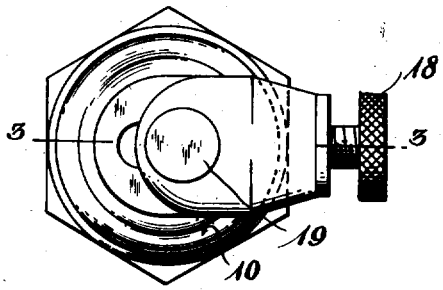
Figure 5:
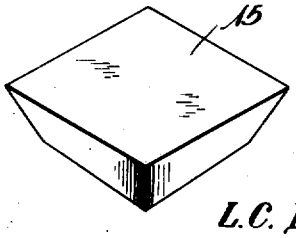

In describing the invention in detail reference will be made to the accompanying drawings wherein like characters of reference denote corresponding parts in the several views; and in which:

Figure 1 is a side elevation of a nozzle constructed in accordance with the invention; Fig. 2, a plan view of same; Fig. 3, a section on the line 3—3 of Fig. 2; Fig. 4, a section on the line 4—4 of Fig. 1; and, Fig. 5, a detail perspective view of the sliding disk employed in the nozzle.

Referring to the drawings, the nozzle is shown as comprising a body 10 which is provided near one end with a transverse slot 11, while a longitudinal passage 12 opens through one wall of said slot and through the other end of said body. Disposed on opposite sides of the opening formed by the passage 12 in the wall of the slot 11 are guide rails 13 and 14 respectively. Mounted for a sliding movement between said guide rails is a disk valve 15 through the instrumentality of which communication between the passage 12 and the slot 11 is controlled. The valve disk 15 has the shape of a pyramidal frustum and is inserted in the slot 11 with its sides converging toward the side of the slot through which the passage 12 opens. The sides of the guide rails 13 and 14 are beveled as at 16 and 17 respectively so as to conform with the shape of the sides of the valve disk 15. By this construction it will be apparent that the valve disk 15 is provided with four corresponding wearing surfaces adapted to be successively presented, as one surface is worn away, to receive the force of the water issuing through the opening formed in the slot 11 by the passage 12. This reversible nature of the valve disk 15 will therefore greatly prolong the life of the valve disk and the period the nozzle can be used without attention.

In order to slide the valve disk 15 from the rear toward the front of the slot 11 there is mounted in the body 10 a set screw 18, the inner end of which projects into and moves toward and away from the front end of said slot. By turning this screw so as to move toward the front end of the slot 11 it will be apparent that the inner end thereof will engage the inner end of the valve disk and in turn slide said disk toward the front end of the slot 11 so as to close communication between said slot and the passage 12. In order to lock said disk against sliding movement after same has been correctly adjusted with respect to the opening through the wall of the slot there is mounted in the upper end of the body 10 a set screw 19, the inner end of which is adapted to engage the top of the disk 15 and bind the latter firmly against the wall of the slot 11 through which the passage 12 opens.

What is claimed is:

1. The combination with a nozzle of a baffle having a plurality of effective faces comprised in its peripheral edge and movable to bring any one of said faces into active position, and means for holding said baffle against movement to maintain the desired effective face thereof in active position.

2. A nozzle comprising a body having a transverse slot therein at one end and a longitudinal passage opening through one wall of said slot and the other end of the body, a slidable disk mounted in said slot adapted to open and close said passage, means for sliding said disk, and means for locking said disk against sliding movement.

3. A nozzle comprising a body having a transverse slot therein at one end and a longitudinal passage opening through one wall of said slot and the other end of the body, a slidable disk mounted in said slot adapted to open and close said passage, a thumb screw mounted in said body adapted when moved inwardly to engage one end of the disk and slide same toward the outer end of the slot, and a second set screw mounted in said body adapted when moved inwardly to engage one side of the disk and force same against the side of the slot through which the passage opens.

4. A nozzle comprising a body having a transverse slot therein at one end and a longitudinal passage opening through one wall of said slot and the other end of the body, a slidable disk mounted in said slot adapted to open and close said passage, said slidable disk having its sides converging toward the side of the slot through which the passage opens, means for sliding said disk, and means for locking said disk against sliding movement.

5. A nozzle comprising a body having a transverse slot therein at one end and a longitudinal passage opening through one wall of said slot and the other end of the body, guide rails mounted in said slot on opposite sides of the passage, a slidable disk mounted between said guide rails adapted to open and close said passage, means for sliding said disk and means for locking said disk against sliding movement.

6. A nozzle comprising a body having a transverse slot therein at one end and a longitudinal passage opening through one wall of said slot and the other end of the body, a slidable disk mounted in said slot adapted to open and close said passage, the sides of said disk being equal, whereby the position of said sides with relation to said slot may be varied at will, means for sliding said disk, and means for locking said disk against sliding movement.

In testimony whereof, I affix my signature, in presence of two witnesses.

LEWIS C. BOWERS.

Witnesses:
NORMAN GRATZ,
VESTA HALL.

Copies of this patent may be obtained for five cents each, by addressing the "Commissioner of Patents, Washington, D. C."